(12) United States Patent
Matsumoto et al.

(10) Patent No.: US 8,113,051 B2
(45) Date of Patent: Feb. 14, 2012

(54) ANGULAR VELOCITY MEASURING DEVICE

(75) Inventors: Masahiro Matsumoto, Hitachi (JP); Yasushi Okada, Tendo (JP); Toshiaki Nakamura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 493 days.

(21) Appl. No.: 12/389,056

(22) Filed: Feb. 19, 2009

(65) Prior Publication Data

US 2009/0235742 A1    Sep. 24, 2009

(30) Foreign Application Priority Data

Mar. 21, 2008   (JP) ................................. 2008-072763

(51) Int. Cl.
*G01P 3/44* (2006.01)

(52) U.S. Cl. .................................. 73/504.12; 73/504.02

(58) Field of Classification Search ............... 73/504.02, 73/504.12
See application file for complete search history.

(56) References Cited

U.S. PATENT DOCUMENTS

| 4,222,270 | A * | 9/1980 | Allen ......................... 73/504.11 |
| 5,197,331 | A * | 3/1993 | Oikawa ...................... 73/504.12 |
| 5,736,640 | A * | 4/1998 | Farine et al. ............... 73/504.12 |
| 6,267,008 | B1 | 7/2001 | Nagao |
| 6,276,204 | B1 | 8/2001 | Townsend |
| 6,490,924 | B2 * | 12/2002 | Kato et al. ................. 73/504.12 |
| 7,805,993 | B2 * | 10/2010 | Spahlinger ................ 73/504.02 |
| 2006/0250194 | A1 | 11/2006 | Spahlinger |
| 2010/0132462 | A1 * | 6/2010 | Nakamura et al. ......... 73/504.12 |

FOREIGN PATENT DOCUMENTS

| JP | 2000-193460 A | 7/2000 |
| JP | 2000-513452 A | 10/2000 |
| JP | 2004-4127 A | 1/2004 |
| JP | 2006-525490 A | 11/2006 |
| WO | WO 2006/082128 A1 | 8/2006 |

OTHER PUBLICATIONS

Japanese Office Action dated May 21, 2010 Two (2) pages.

* cited by examiner

*Primary Examiner* — Freddie Kirkland, III
(74) *Attorney, Agent, or Firm* — Crowell & Moring LLP

(57) ABSTRACT

An oscillator is oscillated at a predetermined oscillation frequency. A detecting unit exerts Coriolis force on the oscillator. A repetitive control system applies an external force to the oscillator so as to cancel out the Coriolis force to achieve an angular velocity measuring operation at a high sensitivity and a high S/N ratio.

8 Claims, 5 Drawing Sheets

ANGULAR VELOCITY MEASURING DEVICE

BACKGROUND OF THE INVENTION

1. Field of the Invention

The present invention relates to an oscillation type angular velocity measuring device and, more particularly, to an angular velocity measuring device capable of reducing the influence of the nonlinearity of a beam supporting an oscillator.

2. Description of the Related Art

An acceleration-and-angular velocity measuring device disclosed in JP-A 2004-4127 and a self-diagnosing measuring device disclosed in WO 2006/082128 are examples of an angular velocity measuring device provided with an oscillator having a predetermined mass and capable of oscillating at a predetermined frequency, and capable of exerting external force on the oscillator to cancel out a displacement caused by Coriolis force Enhancement of Coriolis force and sensitivity to the highest possible extent, reduction of noise component to the lowest possible extent and improving the S/N ratio are problems with the oscillation type angular velocity measuring device. The acceleration-and-angular velocity measuring device disclosed in JP-A 2004-4127 is designed to improve the S/N ratio through the synchronous detection of a measured displacement of the oscillator caused by Coriolis force. The self-diagnosing measuring device disclosed in WO 2006/082128 is provided with a servomechanism that reduces displacement caused by Coriolis force to zero. The self-diagnosing measuring device is designed to improve the S/N ratio through the synchronous detection of the output of the servomechanism. Although this prior art can reduce the noise component by synchronous detection, the prior art failed in taking measures for improving sensitivity into consideration.

The sensitivity of the oscillation type angular velocity measuring device to angular velocity can be enhanced by increasing the amplitude of oscillation of the oscillator. However, when the amplitude of oscillation of the oscillator is increased, the oscillation of the oscillator is distorted and saturation of oscillate amplitude or asymmetric oscillation occurs due to the nonlinearity of a beam supporting the oscillator. The distortion of the oscillation of the oscillator distorts the Coriolis force produced by the oscillation of the oscillator and a Coriolis force having a harmonic component is produced.

The acceleration-and-angular velocity measuring device disclosed in JP-A 2004-4127 detects only the oscillation of the predetermined frequency of the oscillator by synchronous detection and feeds back only a component of a predetermined frequency of the oscillation of the oscillator to reduce the oscillation of the predetermined frequency to zero. Thus, a harmonic component is not fed back. Consequently, the instability of a control system is enhanced and measurement error increases. Therefore, there is a limit to the increase of the amplitude of the oscillation of the oscillator.

In the self-diagnosing measuring device disclosed in WO 2006/082128, the servomechanism reduces the displacement of the oscillator caused by the Coriolis force to zero. However, there is a limit to the increase of gain of the servomechanism and there is a limit to the response characteristic because the oscillator has a resonance characteristic. When the amplitude of the oscillation of the oscillator is increased to improve sensitivity, the feedback control of the harmonic component of the Coriolis force due to the nonlinearity of the beam does not function and measurement error increases. Thus, there is a limit to increasing the amplitude of the oscillation of the oscillator.

SUMMARY OF THE INVENTION

Accordingly, it is an object of the present invention to provide an angular velocity measuring device having high sensitivity and capable of making the feedback control of Coriolis force function effectively even if the oscillation of the oscillator is distorted when the amplitude of the oscillation of the oscillator is increased, of preventing the instability of the servomechanism resulting from the distortion of the oscillation of the oscillator and of improving the S/N ratio.

The present invention provides an angular velocity measuring device including: an oscillator that oscillates at a predetermined frequency, a detecting unit that make Coriolis force act on the oscillator, and a control system that applies external force repeatedly to the oscillator so as to cancel out the Coriolis force.

According to the present invention, feedback control of Coriolis force functions effectively even if the oscillation of the oscillator is distorted when the amplitude of the oscillation of the oscillator is increased, the instability of the servomechanism resulting from the distortion of the oscillation of the oscillator can be prevented and measuring error can be reduced. Thus, the angular velocity measuring device has high sensitivity and can improve the S/N ratio.

BRIEF DESCRIPTION OF THE DRAWINGS

The above and other objects, features and advantages of the present invention will become apparent from the following description taken in connection with the accompanying drawings, in which.

DESCRIPTION OF THE PREFERRED EMBODIMENTS

Preferred embodiments of the present invention will be described with reference to the accompanying drawings.

Figure 1:
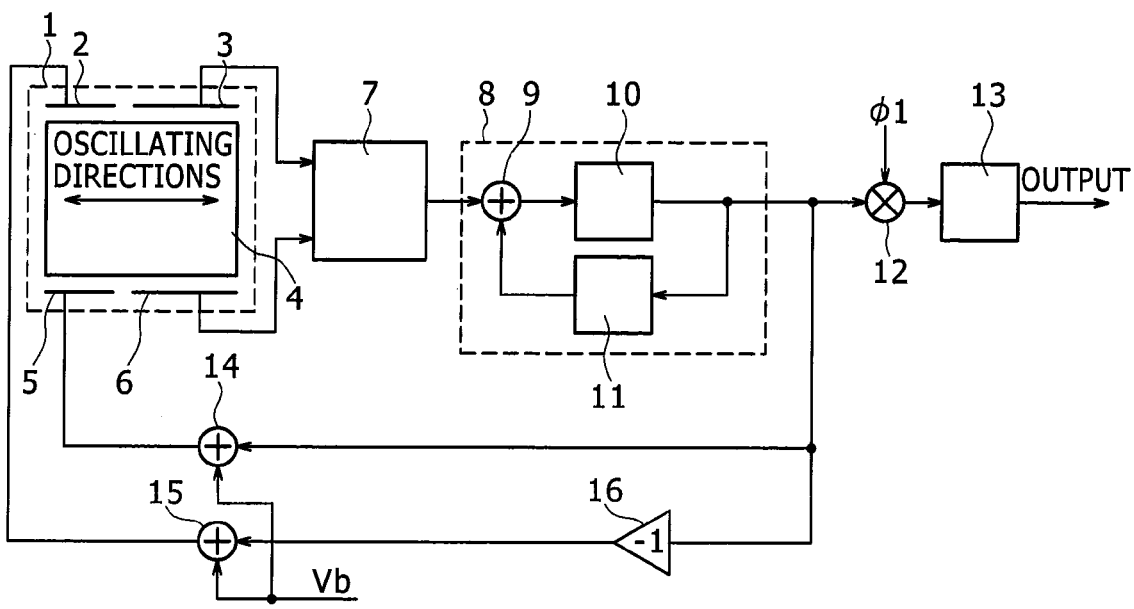
FIG. 1 is a circuit diagram of a signal processing unit included in an angular velocity measuring device in a first embodiment according to the present invention.

An angular velocity measuring device in a first embodiment according to the present invention will be described with reference to FIGS. 1 to 3. FIG. 1 is a circuit diagram of a signal processing unit included in an angular velocity measuring device in a first embodiment according to the present invention, FIG. 2 is a time chart of assistance in explaining the operation of the signal processing unit of the angular velocity measuring device in the first embodiment and FIG. 3 is a diagram of assistance in explaining the transfer characteristic of a repetitive control system 8 of the angular velocity measuring device in the first embodiment.

A detector 1 included in the angular velocity measuring device includes an oscillator 4 having a predetermined mass and capable of oscillating in directions indicated by the arrows in FIG. 1 at a predetermined frequency fd, fixed electrodes 3 and 6 (displacement measuring means) disposed opposite to the oscillator 4, and fixed electrodes 2 and 5 (external force producing means) disposed opposite to the oscillator 4. The fixed electrodes 3 and 6 determines the displacement of the oscillator 4 caused by Coriolis force acting on the oscillator 4 through the measurement of a change in static capacitance. The fixed electrodes 2 and 5 apply electrostatic force to the oscillator 4 so as to cancel out the Coriolis force acting on the oscillator 4.

Figure 2:
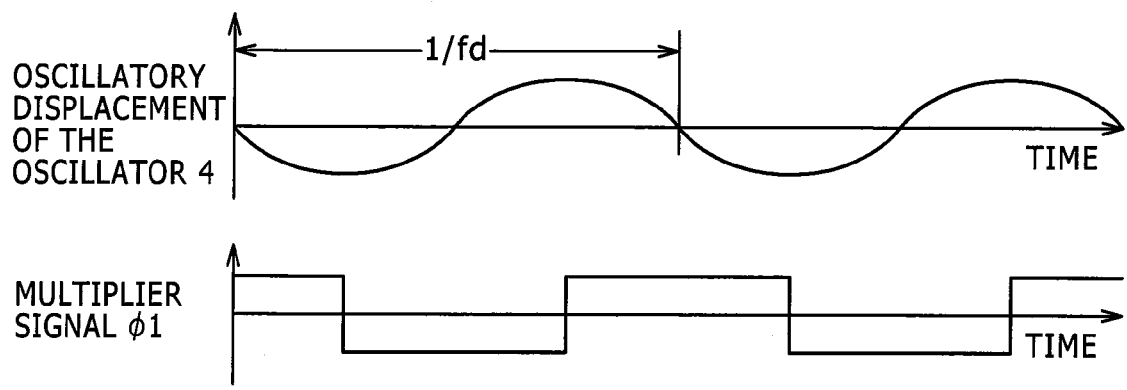
FIG. 2 is a time chart of assistance in explaining the operation of the signal processing unit of the angular velocity measuring device in the first embodiment.
Figure 3:
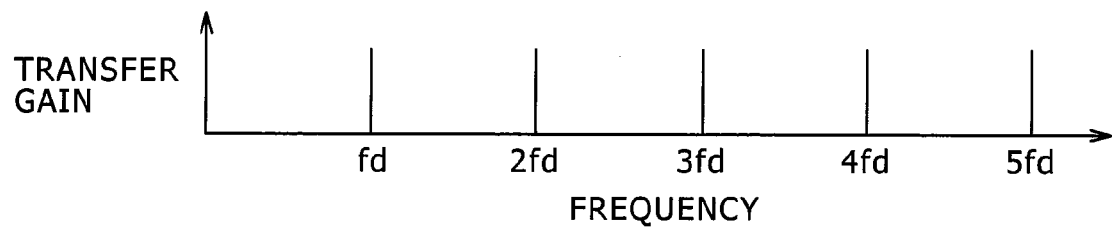
FIG. 3 is a diagram of assistance in explaining the transfer characteristic of a repetitive control system of the angular velocity measuring device in the first embodiment.

The signal processing unit includes a capacitance measuring device 7 for determining a displacement of the oscillator 4 caused by Coriolis force through the measurement of a difference between a capacitance between the fixed electrode 3 and the oscillator and a capacitance between the oscillator 4 and the fixed electrode 6, a repetitive control system 8 including an adder 9, a delay circuit 10 for delaying an output by a time equal to ¼ of the reciprocal of the frequency fd and a delay circuit 11 for delaying an output signal by a time equal to ¾ of the reciprocal of the frequency fd, an adder 14 for applying a voltage to the fixed electrode 5 by adding a fixed bias voltage Vb to the output of the repetitive control system 8, an inverter 16 for inverting the output of the repetitive control system 8, an adder 15 for applying a voltage to the fixed electrode 2 by adding the fixed bias voltage Vb to the inverter 16, a multiplier 12 for multiplying the output of the repetitive control system 8 by a signal φ1 of a phase delayed after the phase of the oscillatory displacement of the oscillator 4 by 90° as shown in FIG. 2 and a low-pass filter (LPF) 13 for filtering out the dc component of the output of the multiplier 12.

A displacement of the oscillator 4 of the angular velocity measuring device caused by Coriolis force acting on the oscillator 4 is determined by the agency of the fixed electrodes 3 and 6 and the capacitance measuring device 7. The Coriolis force acting on the oscillator 4 is canceled out by an electrostatic force generated by applying a voltage to the fixed electrodes 2 and 5 to reduce the displacement of the oscillator 4 caused by Coriolis force to zero. The repetitive control system 8 functions to achieve this operation for reducing the displacement of the oscillator 4 to zero. The repetitive control system 8 is a useful means for dealing with a periodic error and has a transfer characteristic shown in FIG. 3. Thus, the displacement of the oscillator 4 caused by the Coriolis force can be reduced to zero even if the oscillation of the oscillator 4 is distorted and saturation of oscillate amplitude or asymmetric oscillation occurs. Thus, the repetitive control system 8 can rapidly and stably follow the harmonic component of Coriolis force generated by the nonlinear oscillation of the oscillator 4 resulting from the increase of the amplitude of the oscillation of the oscillator 4. Since errors attributable to the unsatisfactory performance of the repetitive control system 8 in following up the harmonic component are not produced in a measurement measured by the angular velocity measuring device, the amplitude of the oscillation of the oscillator 4 can be increased to enhance the sensitivity of the angular velocity measuring device.

The stability of the repetitive control system 8 can be improved by compensating a phase delay of 90° resulting from the resonance characteristic of the oscillator 4 by delaying an output by a time equal to ¼ of the reciprocal of the frequency fd by the delay circuit 10.

Since the repetitive control system 8 has a high frequency selectivity as shown in FIG. 3, the displacement of the oscillator 4 caused by Coriolis force can be measured at a high S/N ratio.

Integral multiples are used as operating clock pulses respectively for the capacitance measuring device 7 and the repetitive control system 8 to simplify a clock pulse generating circuit.

Figure 4:
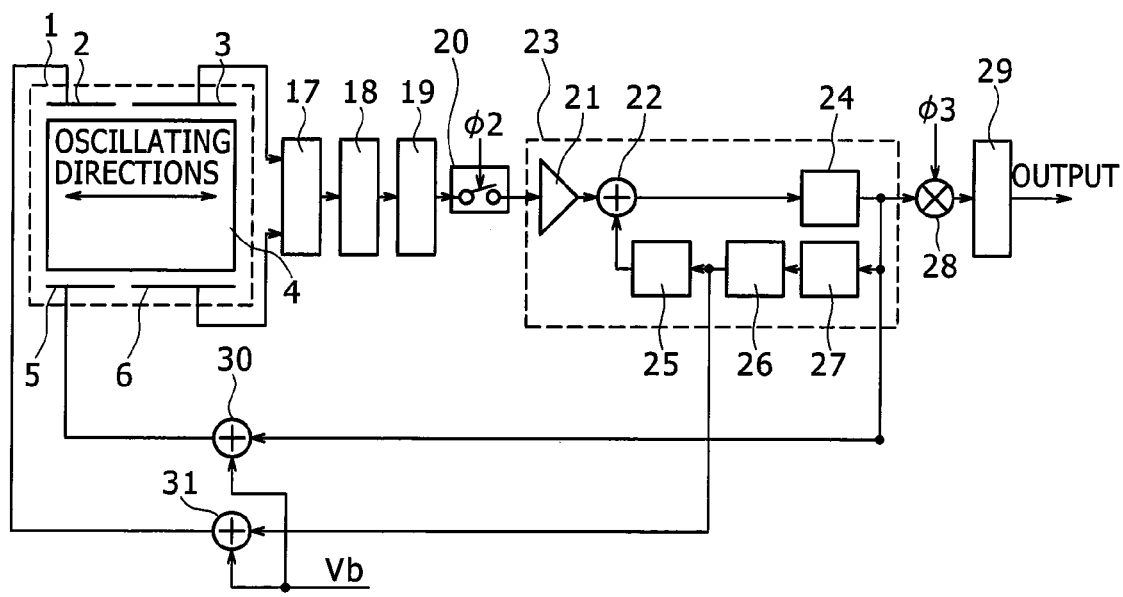
FIG. 4 is a circuit diagram of a signal processing unit included in an angular velocity measuring device in a second embodiment according to the present invention.
Figure 5:
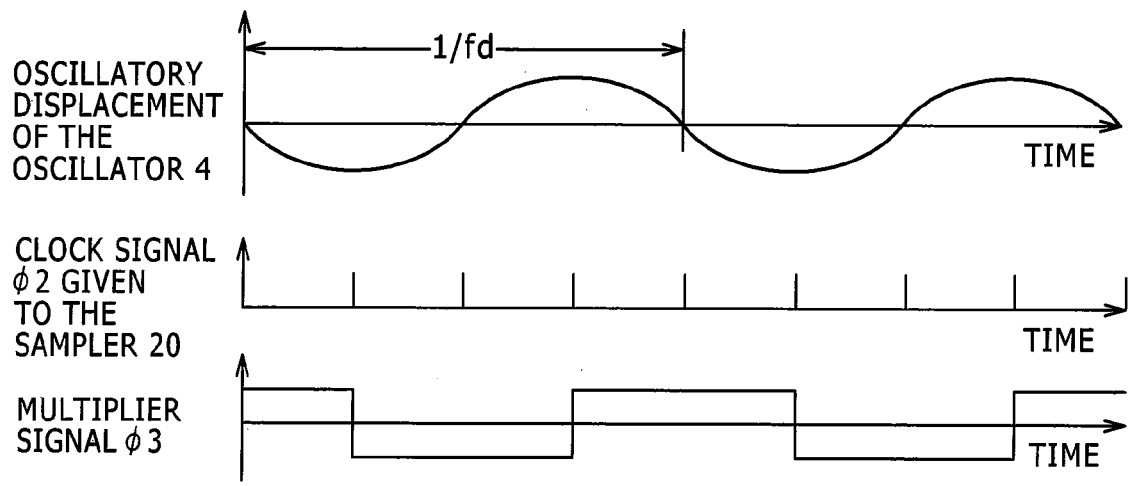
FIG. 5 is a time chart of assistance in explaining the operation of the signal processing unit of the angular velocity measuring device in the second embodiment.

An angular velocity measuring device in a second embodiment according to the present invention will be described with reference to FIGS. 4 and 5. FIG. 4 is a circuit diagram of a signal processing unit included in the angular velocity measuring device in the second embodiment and FIG. 5 is a time chart of assistance in explaining the operation of the signal processing unit of the angular velocity measuring device in the second embodiment. The angular velocity measuring device in the second embodiment is formed by combining a ΔΣ modulator with the signal processing circuit of the angular velocity measuring device in the first embodiment. A detector 1 included in the angular velocity measuring device in the second embodiment, similarly to that of the first embodiment, includes an oscillator 4 having a predetermined mass and capable of oscillating at a predetermined frequency fd, fixed electrodes 3 and 6 disposed opposite to the oscillator 4 to measure a displacement caused by Coriolis force acting on the oscillator 4, and fixed electrodes 2 and 5 disposed opposite to the oscillator 4 to apply an electrostatic force to the oscillator 4 so as to balance the Coriolis force with the electrostatic force. The signal processing unit includes a capacitance measuring device 17 for determining a displacement of the oscillator 4 caused by Coriolis force through the measurement of a difference between a capacitance between the fixed electrode 3 and the oscillator 4 and a capacitance between the oscillator 4 and the fixed electrode 6, a ΔΣ modulator 18 for modulating the output of the capacitance measuring unit 17 by ΔΣ modulation, a decimeter 19 for sampling the output of the ΔΣ modulator 18 at a frequency four times the frequency fd of the oscillator 4, a sampler 20 for sampling the output of the decimeter 19 at a frequency equal to four times the frequency fd of oscillation of the oscillator 4 shown in FIG. 5, a repetitive control system 23 including a coefficient multiplier 21 for determining an integral gain, an adder 22 that carries out an integration operation and delay circuits 24, 25, 26 and 27 for delaying an output by a time equal to ¼ of the reciprocal of the frequency fd, an adder 30 for applying a voltage to the fixed electrode 5 by adding a fixed bias voltage Vb to the output of the delay circuit 24, an adder 31 for applying a voltage to the fixed electrode 2 by adding a fixed bias voltage Vb to the output of the delay circuit 26, a multiplier 28 for multiplying the output of the delay circuit 24 by a signal φ3 of a phase delayed after the phase of the oscillatory displacement of the oscillator 4 by 90° as shown in FIG. 5 and a low-pass filter (LPF) 29 for filtering out the dc component of the output of the multiplier 28.

The angular velocity measuring device in the second embodiment executes a sampling operation at a frequency equal to four times the frequency fd of the oscillation of the oscillator 4. The repetitive control system 23 is formed by arranging the four delay circuits 24, 25, 26 and 27 in a series arrangement. Since the repetitive control system 23 has the four delay circuits 24, 25, 26 and 27, the repetitive control system 23 can deal with harmonics resulting from distortion caused by Coriolis force and having frequencies up to twice the fundamental frequency. The repetitive control system 23 can deal with harmonics having frequencies up to four times the fundamental frequency when the repetitive control system 28 includes eight delay circuit and execute a sampling operation at a frequency equal to eight times the frequency fd and can deal with harmonics having frequencies up to eight times the fundamental frequency when the repetitive control system 28 includes sixteen delay circuit and execute a sampling operation at a frequency equal to sixteen times the frequency fd. The inverter 16 of the first embodiment is eliminated by delaying the phase by 180° by giving the output of the delay circuit 26 to the adder 31. Errors attributable to phase shift of the angular velocity measuring device can be eliminated by equalizing the respective phases of the oscillatory displacement of the oscillator 4 and the sampling signal φ2.

Figure 6:
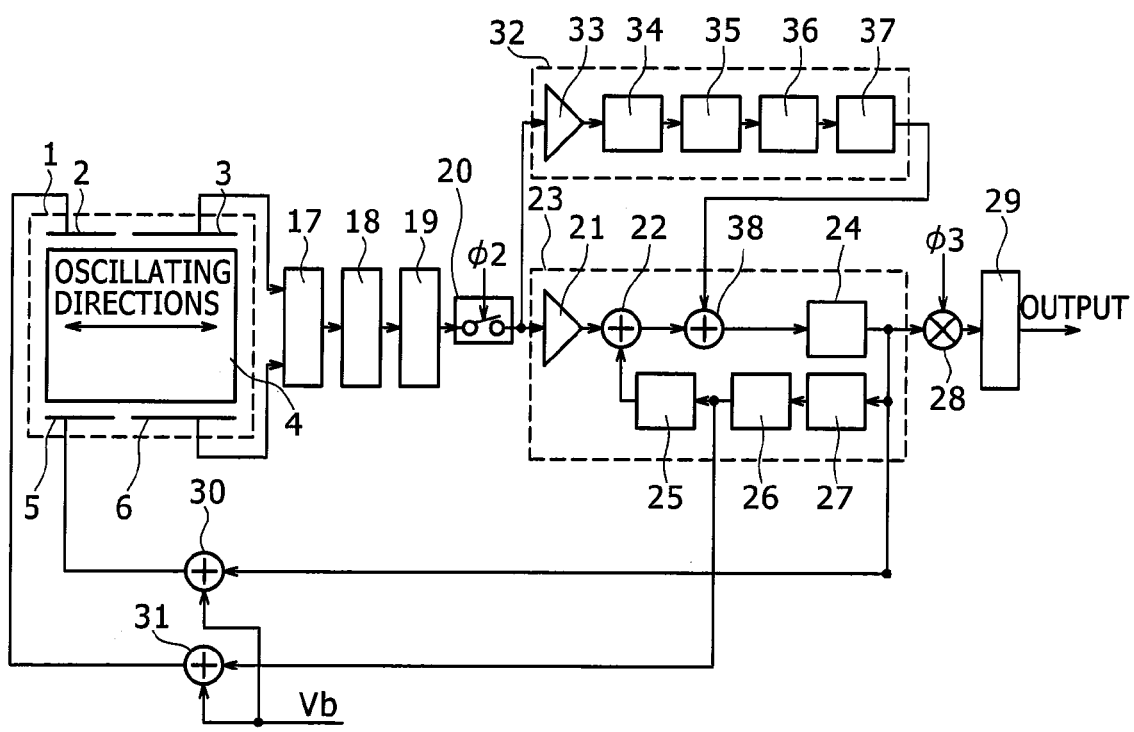
FIG. 6 is a circuit diagram of a signal processing unit included in an angular velocity measuring device in a third embodiment according to the present invention.

An angular velocity measuring device in a third embodiment according to the present invention will be described with reference to FIG. 6. FIG. 6 is a circuit diagram of a signal processing unit included in the angular velocity measuring device in the third embodiment. The angular velocity measuring device in the third embodiment is formed by combining a proportional element 32 with the repetitive control system 23 of the second embodiment. The repetitive control system 23 of the second embodiment having only the integration element is somewhat unsatisfactory in response speed. The proportional element 32 is added to the repetitive control system 23 to improve this drawback. The proportional element 32 includes a coefficient multiplier 33 for determining a proportional gain and delay circuits 34, 35, 36 and 37. The output of the proportional element 32 is given through an adder 38 to the repetitive control system 23. The response speed of the angular velocity measuring device in the third embodiment is higher than that of the first embodiment.

Figure 7:
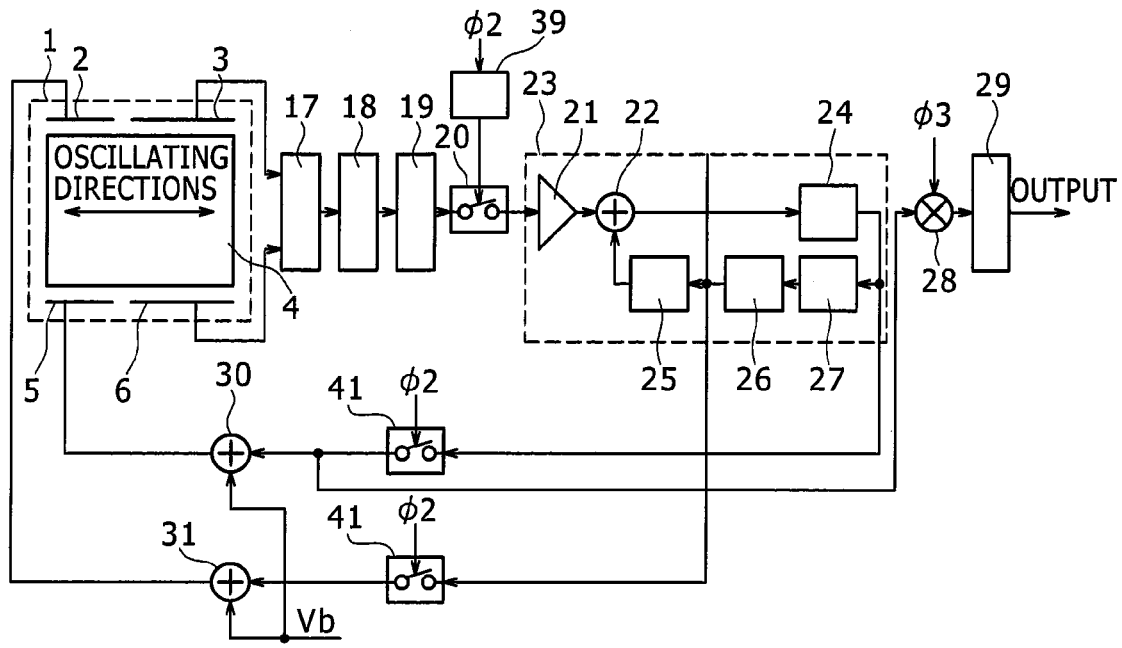
FIG. 7 is a circuit diagram of a signal processing unit included in an angular velocity measuring device in a fourth embodiment according to the present invention.

An angular velocity measuring device in a fourth embodiment according to the present invention will be described with reference to FIG. 7. FIG. 7 shows a signal processing circuit included in the angular velocity measuring device in the fourth embodiment. The angular velocity measuring device in the fourth embodiment is formed by adding a delay circuit 39 and samplers 40 and 41 to the second embodiment. The delay circuit 39 delays the time when a decimeter 19 provides an output to stabilize a repetitive control system 23 by exerting a damping effect on the repetitive control system 23. A damping effect can be exerted on the repetitive control system 23 by delaying the timing of the input sampling operation of the repetitive control system 23. Thus, the stability of the repetitive control system 23 can be improved. However, if signals to be given to fixed electrodes 2 and 5 are delayed, an error is made in the output of the angular velocity measuring device due to phase shift. The phase shift is compensated by the samplers 40 and 41 to prevent making an error in the angular velocity measuring device due to phase shift.

Figure 8:
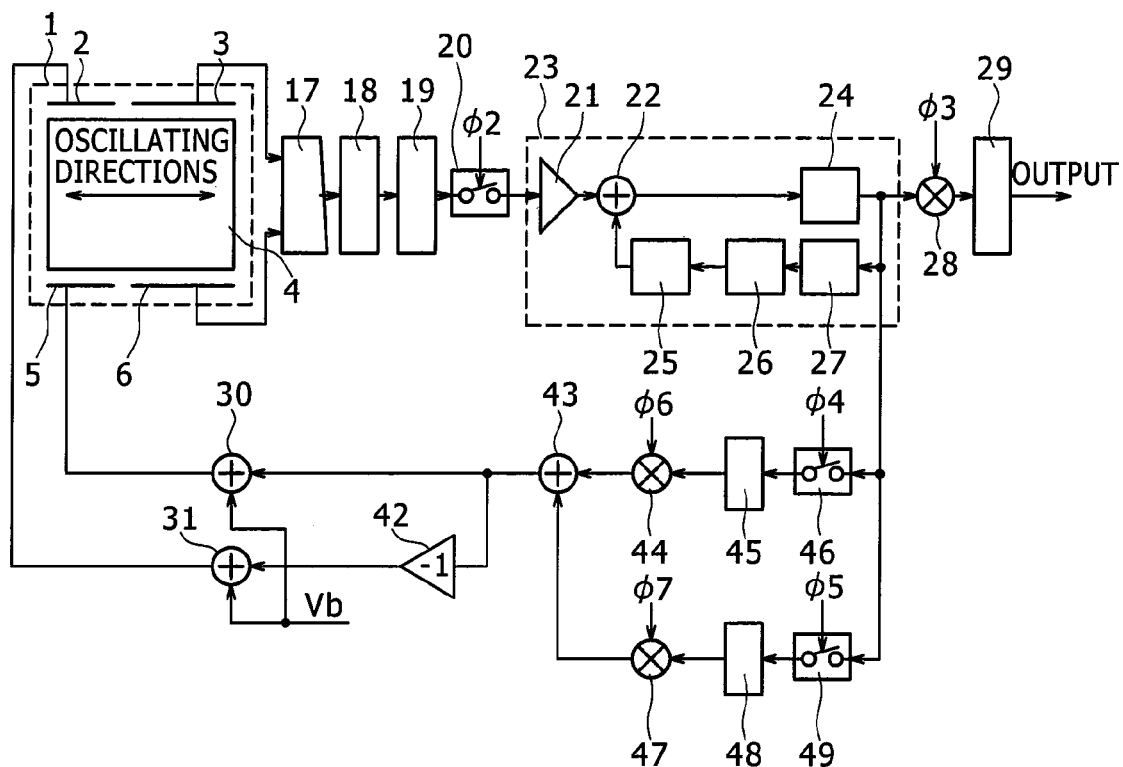
FIG. 8 is a circuit diagram of a signal processing unit included in an angular velocity measuring device in a fifth embodiment according to the present invention.
Figure 9:
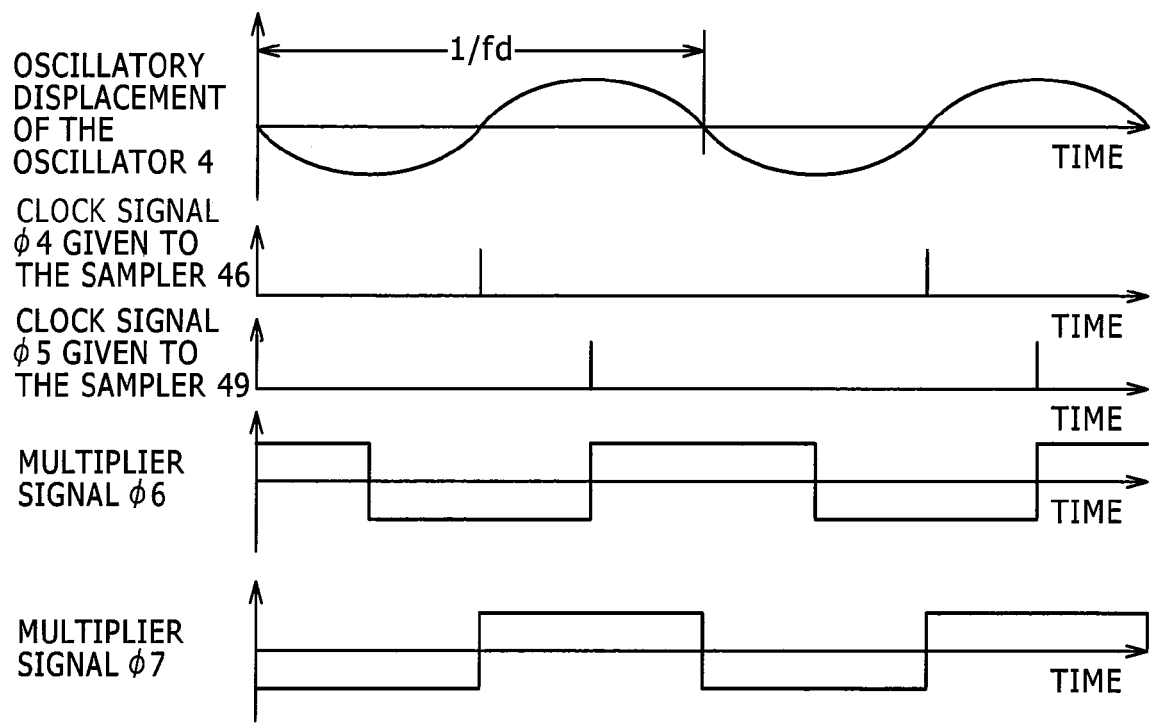
FIG. 9 is a time chart of assistance in explaining the operation of the signal processing unit of the angular velocity measuring device in the fifth embodiment.

An angular velocity measuring device in a fifth embodiment according to the present invention will be described with reference to FIGS. 8 and 9. FIG. 8 is a circuit diagram of a signal processing unit included in the angular velocity measuring device in the fifth embodiment and FIG. 9 is a time chart of assistance in explaining the operation of the signal processing unit of the angular velocity measuring device in the fifth embodiment. The angular velocity measuring device in the fifth embodiment is formed by adding a sampler 46 that performs a sampling operation according to a clock signal φ4 of a phase of 0° shown in FIG. 9, a sampler 49 that performs a sampling operation according to a clock signal φ5 of a phase of 90° shown in FIG. 9, hold circuits 45 and 48 for holding the outputs of the samplers 46 and 49, a multiplier 44 that produces a signal having a peak value corresponding to the output of the hold circuit 45, a frequency equal to the frequency fd of the oscillation of an oscillator 4, and a phase delayed by 90° after the oscillatory displacement of the oscillator 4 by multiplying the output of the hold circuit 45 by a multiplication signal φ6 shown in FIG. 9, a multiplier 47 that produces a signal having a peak value corresponding to the output of the hold circuit 48, a frequency equal to the frequency fd of the oscillation of the oscillator 4 and a phase coinciding with the oscillatory displacement of the oscillator 4 by multiplying the output of the hold circuit 48 by a multiplication signal φ7 shown in FIG. 9, an adder 43 for adding the respective outputs of the multipliers 44 and 47, an inverter 42 for inverting the output of the adder 43 to the angular velocity measuring device in the second embodiment. Thus, only signals having the frequency fd are used selectively for feedback control. Since only the signals having the frequency fd are used selectively for feedback control, the angular velocity measuring device can perform a stable operation even if the Q of the oscillator 4 is high.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An angular velocity measuring device comprising:
   an oscillator having a predetermined mass and capable of oscillating at a predetermined oscillation frequency;
   a displacement measuring means for measuring a displacement of the oscillator caused by Coriolis force acting on the oscillator;
   an external force generating means for generating an external force to be exerted on the oscillator;
   a repetitive control system for controlling the external force generating means so that an output of the displacement measuring means is reduced to zero by repetition control at a time equal to the reciprocal of the predetermined oscillation frequency; and
   wherein the repetitive control system include a first delay circuit for delaying an output by a time equal to ¼ of the reciprocal of the predetermined oscillation frequency, a second delay circuit for delaying an output signal by a time equal to ¾ of the reciprocal of the predetermined oscillation frequency, and an output means for giving an output of the first delay circuit to the external force generating means.

2. The angular velocity measuring device according to claim 1 further comprising:
   a ΔΣ modulator for modulating the output of the displacement measuring means by ΔΣ modulation; and
   a decimeter for sampling an output of the ΔΣ modulator at a frequency equal to an integral multiple of the predetermined oscillation frequency and not lower than four times the predetermined oscillation frequency.

3. The angular velocity measuring device according to claim 2, wherein the decimeter samples the output of the ΔΣ modulator at a frequency equal to four times the predetermined oscillation frequency.

4. The angular velocity measuring device according to claim 3 further comprising delay circuits delaying an output signal by a delay time equal to the reciprocal of an output frequency of the decimeter;

wherein the number of the delay circuits is equal to a number obtained by dividing the output frequency of the decimeter by the predetermined oscillation frequency, the delay circuits are connected in a series connection, and an output of the delay circuit at a front quarter position of the series arrangement of the delay circuits is given to the external force generating means.

5. The angular velocity measuring device according to claim 4 further comprising a delaying means for delaying the output of the decimeter.

6. The angular velocity measuring device according to claim 3 further comprising a delaying means for delaying the output of the decimeter.

7. The angular velocity measuring device according to claim 2 further comprising a delaying means for delaying the output of the decimeter.

8. The angular velocity measuring device according to claim 1 further comprising:
 a first sampling means for sampling the output of the repetitive control system at sampling points defined by a signal synchronous with the oscillation of the oscillator;
 a second sampling means for sampling the output of the repetitive control system at sampling points defined by a signal of a phase delayed by 90° after the phase of the oscillation of the oscillator;
 a first multiplying means for multiplying an output of the first sampling means by a signal of a phase delayed by 90° after the oscillation of the oscillator; and
 a second multiplier for multiplying an output of the second sampling means by a signal synchronous with the oscillation of the oscillator.

* * * * *